May 29, 1956
E. J. DILLMAN ET AL
2,748,224
CONTROL DEVICE
Filed Aug. 17, 1954
2 Sheets-Sheet 1
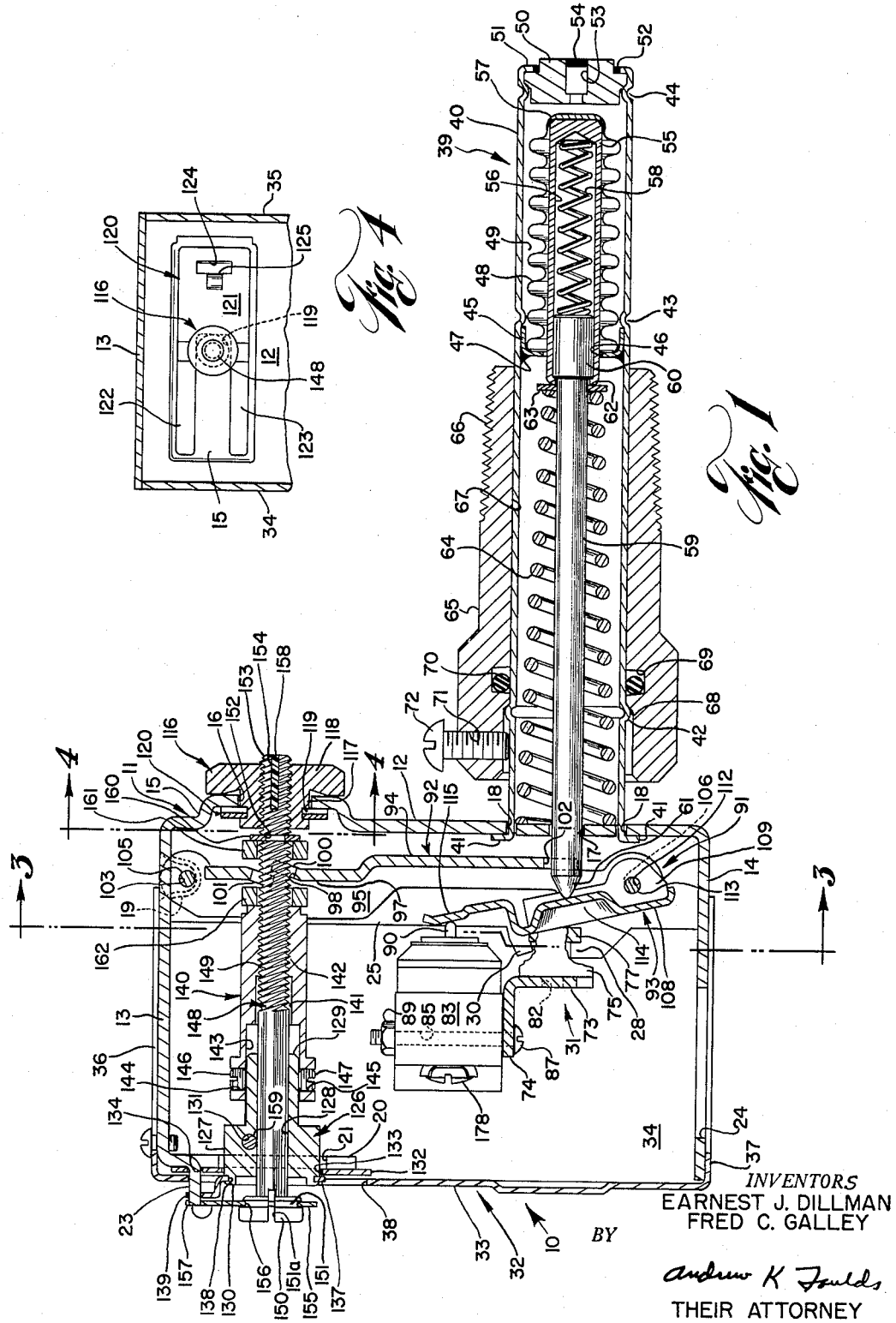
INVENTORS
EARNEST J. DILLMAN
FRED C. GALLEY
BY
Andrew K. Foulds
THEIR ATTORNEY May 29, 1956  E. J. DILLMAN ET AL  2,748,224
CONTROL DEVICE Filed Aug. 17, 1954  2 Sheets-Sheet 2

*INVENTORS*
EARNEST J. DILLMAN
FRED C. GALLEY
BY
Andrew K. Foulds
THEIR ATTORNEY United States Patent Office 2,748,224
Patented May 29, 1956

2,748,224

CONTROL DEVICE

Earnest J. Dillman and Fred C. Galley, Detroit, Mich., assignors to Detroit Controls Corporation, Detroit, Mich., a corporation of Michigan Application August 17, 1954, Serial No. 450,496

17 Claims. (Cl. 200—140)

This invention relates generally to a control device and more particularly to a control device operable to be actuated at a predetermined temperature.

An object of this invention is to provide a control device having a new and improved arrangement of the operating parts thereof.

Another object of this invention is to provide a control device that may be easily calibrated at the factory so that it will be actuated at a predetermined temperature.

Another object is to provide a control device wherein the temperature at which actuation is desired may be easily changed after the control device is assembled and calibrated.

Another object of this invention is to provide a control device having a differential means operable to permit the device to remain actuated during a predetermined range of temperature.

Another object of this invention is to provide a control device having adjustment means operable to vary or change the range of the differential means.

The invention consists in the improved construction and combination of parts to be more fully described hereinafter and the novelty of which will be particularly pointed out and distinctly claimed.

Figure 5:
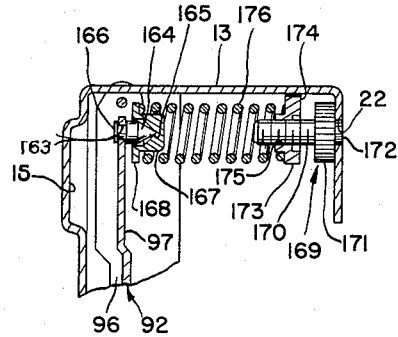
Figure 2:
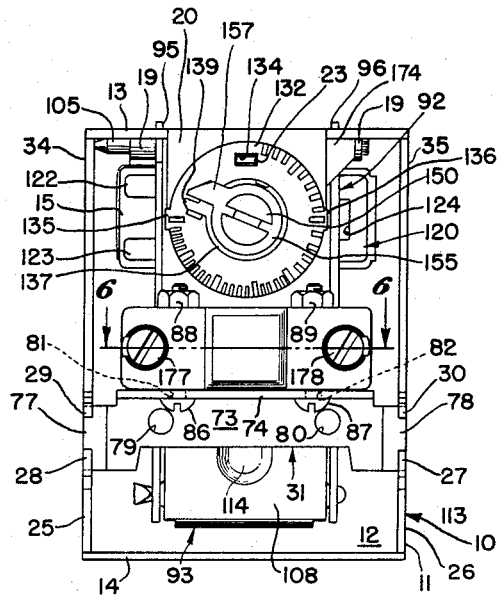
Figure 3:
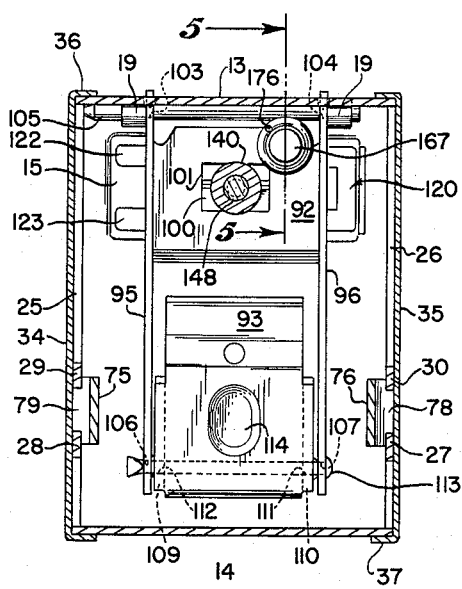
Figure 6:
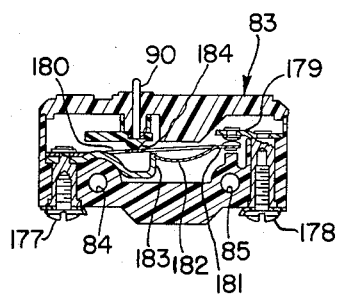

In the accompanying drawings to be taken as part of the specification, there is fully and clearly illustrated our invention in which drawings:

Figure 1 is a view in vertical cross section of a control device embodying our invention, Fig. 2 is an end view in elevation with the cover member removed, Fig. 3 is a view in section taken along the line 3—3 in Figure 1 showing the lever combination, Fig. 4 is a view in section taken along the line 4—4 in Figure 1 showing the friction spring in detail, Fig. 5 is a view in section taken along the line 5—5 in Fig. 3 showing the spring member which acts on the lever members, and Fig. 6 is a view in longitudinal section of the switch member taken along the lines 6—6 in Fig. 2.

Referring to the drawings by characters of reference, the numeral 10 generally designates the control device casing which has a frame member 11. The frame member 11 has a body portion or wall 12, a top flange 13, and bottom flange 14. The top and bottom flanges 13 and 14, respectively, are spaced from and parallel to each other. The body portion 12 has an indented portion 15 with a central aperture 16 therethrough substantially adjacent to the top flange 13. The body portion 12 also has an aperture 17 with a plurality of equi-spaced apertures 18 therearound. The apertures 17 and 18 are substantially adjacent to the bottom flange 14. The top flange 13 extends substantially normal to the body portion 12 and has a pair of pin supporting portions 19 extending therefrom substantially adjacent to the body portion 12. A portion of the top flange 13 is bent downwardly from its free end and forms a shaft supporting portion 20. The shaft supporting portion 20 has a central aperture 21 therethrough and a spring adjustment retaining aperture 22 adjacent the central aperture 21 as shown in Fig. 5. A stop member 23 is formed from the shaft supporting portion 20 substantially adjacent to and above the central aperture 21. The aperture 21 is substantially aligned with the aperture 16 in the frame body portion 12. The bottom flange 14 has a conduit receiving aperture 24 therethrough. The body portion 12 has a pair of side wall flange portions 25 and 26. The side wall flanges 25 and 26 are parallel to each other and extend from the vertical edges of the body portion 12 and abut at their top and bottom edges the top and bottom flanges 13 and 14, respectively, thereby forming a rigid frame structure. The side wall flange portions 25 and 26 each have aligned hook portions 27 and 28. Adjacent and above the hook portions 27 and 28 are securing tab portions 29 and 30, respectively. The hook and tab portions are operable to secure a switch supporting structure 31 thereto.

A cover member generally designated by the numeral 32 has a front body portion 33 and a pair of side wall flange portions 34 and 35 which are parallel to each other. The side wall flanges 34 and 35 and the body portion 33 have inwardly extending top and bottom flange portions 36 and 37 operable to be positioned over the frame flange members 13 and 14, thereby securing the cover member 32 to the frame member 11 and forming the casing 10. The cover member body portion 33 has an aperture 38 substantially aligned with the frame body portion aperture 16.

A thermostatic power element 39 has a tubular housing 40 with one of its end portions having tab members 41 thereon. The power element tubular housing 40 has an outwardly bent circumferential portion 42 substantially adjacent the tab end portions 41 and a pair of inwardly bent circumferential portions 43 and 44 substantially adjacent the other end thereof. A cup-shaped retaining member 45 is positioned within the housing 40 and abutting the indented portion 43. The retaining member 45 has a centrally positioned aperture 46 therethrough and is secured in position by means of solder or the like as shown at 47. A cup-shaped collapsible metal bellows 48 has its open end secured to the retaining member 45 and closes the retaining member aperture 46 thereby forming a chamber as indicated at 49 in the end of the housing 40. A plug member 50 is positioned in the end of the housing 40 and abuts the indented portion 44. The housing end portion 51 is bent to secure the plug member in position and is secured by solder or the like as indicated at 52. The plug member 50 has a central aperture 53 therethrough. Thermostatically expansive fluid is inserted and substantially fills the chamber 49, and the plug aperture 53 is sealed by solder or the like as indicated at 54, thereby hermetically sealing the chamber 49 so that upon expansion of the thermostatically expansive liquid the bellows member will collapse and move toward the housing tab portions 41. A cylindrical guide member 55 having a central longitudinal aperture 56 and a closed end portion 57 is inserted through the retaining member aperture 46 into the inner portion of the bellows 48, and the closed end portion 57 abuts the end wall of the bellows 48. An override spring 58 is positioned within the guide member aperture 56. A stem or rod member 59 having an enlarged head portion 60 and a conically shaped end portion 61 is positioned in the power element housing 40 with the enlarged head portion 60 in the guide member aperture 56. The guide member free end portion 62 is bent inwardly around the stem head portion 60, thereby securing the stem head portion 60 within the guide member 55. The override spring 58 has one end abutting the guide member end wall 57 and its other end abutting the stem head portion 60, thereby biasing the head portion 60 against the guide member bent end portion 62.

The guide member 55 is longitudinally movable in the retaining member aperture 56; and upon the compressive movement of the bellows 48, the guide member 55 will move toward the power element housing tab member 41. A washer type spring retainer 63 is positioned on the stem 59 and abuts the guide member end portion 62. A spring 64 is positioned within the power element housing 40 around the stem 59. The power element housing 40 is secured to the frame body portion 12 with the tab members 41 extending through the body portion apertures 18, and the stem 59 extending through the body portion aperture 17. The housing tab portions 41 are bent so that they abut the inner surface of the frame body portion 12. The spring 64 has one end abutting the washer type spring retainer 63 and its other end abutting the frame body portion outer surface 12, thereby exerting an expansive force on the bellows 48. A tubular connecting member 65 has a threaded outer end portion 66 and a central longitudinal aperture 67 therethrough. There is a shoulder portion 68 and a recessed portion 69 in the aperture 67. An O-ring member 70 is positioned in the recessed portion 69. The tubular connecting member 65 has a threaded aperture 71 substantially normal to its longitudinal axis and a screw 72 is threadedly positioned in the aperture 71. The tubular connecting member 65 is positioned with the power element housing 40 extending through its central aperture 67 and the connecting member shoulder portion 68 abutting the housing outwardly bent portion 42. The O-ring 70 prevents liquid from escaping between the power element housing 40 and the tubular connecting member 65. The screw 72 is operable to rigidly position the connecting member 65 on the power element housing 40.

The switch supporting structure 31 has a body portion 73 and an inwardly extending flange portion 74 substantially normal to the vertical plane of the body portion 73. The body portion 73 has offset end portions 75 and 76 and securing edge portions 77 and 78 as clearly shown in Fig. 2. The body portion 73 has a pair of apertures 79 and 80 therethrough. The switch supporting structure flange portion 74 has a pair of apertures 81 and 82 therethrough. A snap acting switch member 83 having a pair of vertical apertures 84 and 85 therethrough is positioned on the switch supporting structure flange 74 with its apertures substantially aligned with the flange apertures 81 and 82. A pair of bolts 86 and 87 extend through these aligned apertures, and nuts 88 and 89 are threaded respectively thereon, thereby securing the snap acting switch 83 to the switch supporting structure 31. The switch 83 has a plunger 90 extending therefrom and operable upon depression to actuate the switch 83.

Positioned within the casing 10 is a motion transmitting means generally designated by the numeral 91 and operable to transmit the movement of the stem member 59 to the switch plunger member 90. The motion transmitting means includes a pair of levers which may be defined as the main or first lever 92 and a second or actuating lever 93. The main lever 92 has a body portion 94 and a pair of parallel side reinforcing flanges 95 and 96. The body portion 94 has an offset upper portion 97 which is substantially parallel to the main body portion. The offset portion 97 has a central aperture 98 therethrough. Portions of the offset portion adjacent to the aperture 98 are bent away from each other and form edge portions 100 and 101. The edge portion 100 extends toward the frame body portion 12, and the edge portion 101 extends toward the cover body portion 33. The first lever body portion 94 has a semi-circular slotted portion 102 through which the stem 59 extends and is freely movable therethrough. The main lever side flanges 95 and 96 extend upwardly beyond the edge of the body offset portion 97 and have a pair of aligned apertures 103 and 104 therethrough. The apertures 103 and 104 are aligned with the pin supporting portions 19, and a pin member 105 extends through the aligned apertures and pivotally secures the first or main lever 92 to the frame top flange 13. The main lever flange side portions 95 and 96 extend beyond the lower edge of the body portion 94 and have a pair of apertures 106 and 107 therethrough. The second or actuating lever 93 has a body portion 108 and a pair of side reinforcing flanges 109 and 110 which have aligned apertures 111 and 112 at their lower end. The actuating lever flange apertures 111 and 112 are aligned with the first lever apertures 106 and 107 and a pin member 113 extends therethrough. The pin member 113 has an enlarged head portion which abuts the first lever flange 96 and its free end is enlarged after it extends through the respective aligned apertures, thereby pivotally securing the actuating lever 93 to the first or main lever 92. The actuating lever body portion 108 has an indented central portion 114 which is aligned with the conical front edge 61 of the power element stem 59. The actuating lever body portion 108 has an offset bearing end portion 115 which rests against the front edge of the switch plunger 90.

A calibrating nut 116 having a body portion 117 and an enlarged head portion 118 is positioned in the frame aperture 16 with the head portion 118 abutting the outer surface of the frame body portion 12. The body portion 117 has a circumferentially indented portion 119 which has its edge adjacent to the inner surface of the frame indented portion 15.

A friction spring 120 clearly shown in detail in Fig. 4 has a body portion 121 and a pair of prongs 122 and 123 extending at an inclined angle therefrom. The prongs 122 and 123 are so spaced that the space between their inner edges is substantially equal to the diameter of the nut indented portion 119. The spring body portion 121 has a slotted aperture 124 therethrough with an offset portion 125 adjacent to the prongs 122 and 123. The spring 120 is positioned within the frame indented portion 15 with the prongs 122 and 123 extending into the nut recess portions 119. The spring body portion 121 abuts the inner surface of the indented portion 15 and is not rotatable therein due to the dimensions of the indented portion 15 being substantially equal to the dimensions of the spring 120. The prong portions 122 and 123 exert a frictional force on the nut 116 and prevent the same from being freely rotatable in the aperture 16, and the spring 120 also secures and retains the nut 116 within the aperture 16.

The shaft supporting portion 20 has a shaft supporting member 126 positioned in the aperture 21. The shaft supporting member 126 has a cylindrical body portion 127 with a longitudinal aperture 128 therethrough and has an end portion 129 of reduced diameter extending into the casing 10. The shaft supporting member 126 has a ring-like edge portion 130 which extends beyond the outer surface of the frame top flange shaft supporting portion 20. The shaft supporting member 126 has an aperture 131 extending substantially normal to the longitudinal axis of the body portion 127. A disk-shaped dial member 132 has a central aperture 133, an offset slotted aperture 134 therethrough, and a pair of aligned tab members 135 and 136 extending from the outer edge portions. The dial 132 is positioned on the shaft supporting member body portion 127, and the stop member 23 extends through the slotted aperture 134. The tab members 135 and 136 are bent around the edges of the frame shaft supporting portion 20, thus securing the dial member to the frame member 11. It should be noted that the dial member 132 is positioned between the frame shaft supporting portion 20 and the cover body portion 33 and has numerals indicating temperature impressed on its outer face. An actuating pointer 137 has a central aperture 138 and an offset pointer portion 139. The shaft supporting member 126 has the actuating pointer 137 positioned on its end portion adjacent the ring-like edge 130. The edge 130 is peened or riveted over to rigidly secure the actuating pointer 137 to the shaft supporting member 126. The offset pointer portion 139 is operable to engage the frame stop portion 23.

A first shaft 140 has a central longitudinal aperture 141 therethrough with a threaded portion 142 and an enlarged end portion aperture 143. The diameter of the enlarged end portion aperture 143 is substantially equal to the outer diameter of the shaft supporting end portion 129. The shaft 140 has a pair of threaded apertures 144 and 145 adjacent the enlarged end portion aperture 143 and substantially normal to the longitudinal axis of the shaft 140. The shaft 140 is positioned on the shaft supporting member 126 and is longitudinally movable thereon. A pair of set screws 146 and 147 are threadedly secured in the shaft apertures 144 and 145 and are operable to rigidly secure the shaft 140 on the shaft supporting member 126. A second shaft or screw generally designated by the numeral 148 has a threaded portion 149 and an enlarged head portion 150. The enlarged head portion 150 has a pointer receiving portion 151 and a longitudinal slot 151ª. The second shaft threaded portion 149 has a cylindrical recess 152 spaced from its end portion 153. The end portion 153 has a longitudinal slotted portion 154 therein. A differential pointer 155 has an indicator portion 157 extending from its outer edge and a central aperture 156 therethrough. The differential pointer 155 is positioned on the second shaft 148 abutting the inner surface of the head portion 150. The second shaft pointer receiving portion 151 is peened or riveted over to rigidly secure the differential pointer 155 to the second shaft 148. The shaft 148 extends through the aperture 128 in the shaft supporting member 126 with the head portion 150 being positioned beyond the outer wall of the cover body portion 33. The shaft threaded portion 149 is threadedly secured in the threaded aperture 142 of the first shaft 140 and extends through the aperture 98 in the first lever 92. The second shaft threaded end portion 153 is threadedly secured in the calibrating nut 116. A friction insert 158 is positioned in the second shaft slotted portion 154 end exerts a friction on the second shaft 148 so that it will not be freely rotatable in the nut 116. A friction plug 159 is positioned in the shaft supporting aperture 131 to exert a friction on the second shaft 148 so that it is not freely rotatable in the shaft supporting aperture 128. A ring like retaining member 160 is positioned in the second shaft recess portion 152, and a washer member 161 is positioned on the second shaft 148 between the retaining member 160 and the first lever body offset portion 97. A second washer member 162 is positioned on the second shaft 148 between the end of the first shaft 140 and the lever body offset portion 97. The washers 161 and 162 are freely rotatable on the second shaft 148 and are operable to engage the first lever edge portions 100 and 101, respectively.

As shown in Fig. 5, the first lever indented portion 97 has a second aperture 163 substantially adjacent to its upper end portion and substantially adjacent to the side reinforcing flange 96. A pin member 164 having a conical end portion 165 and an end portion of reduced diameter 166 is positioned within the aperture 163 and secured thereto by means of the end portion 166 being peened or bent over to abut the first lever offset portion 97. A cup-shaped spring retainer member 167 having a shoulder portion 168 is positioned with the pin member conical portion 165 abutting the inner surface of the cup-shaped spring retainer member 167. An adjusting screw 169 having a threaded portion 170, an enlarged knurled central portion 171, and a cylindrical end portion 172 is positioned with the cylindrical end portion 172 extending through the aperture 22 in the shaft supporting portion 20. The knurled central portion 171 abuts the inner wall of the shaft supporting portion 20. A plate member 173 has an upper edge portion 174 and a centrally positioned threaded aperture 175. The plate member 173 is threadedly secured on the adjusting screw 169 with the top edge 174 abutting the bottom surface of the frame top flange 13. The edge portion 174 abutting the frame 13 prevents the rotation of the plate 173 when the adjusting screw 169 is rotated. Therefore, it will be seen upon rotative movement of the adjusting screw 169, the plate 173 will move longitudinally thereon. A differential spring 176 is positioned with one end abutting the plate 173 and the other end abutting the retainer member shoulder portion 168, thereby exerting a biasing force on the main lever 92. The rotation of the adjusting screw 169 will increase or decrease this biasing force depending on the relative movement of the plate 173.

The switch 83 clearly illustrated in Fig. 6 is a conventional switch having a pair of terminals 177 and 178. A contact 179 is secured to the terminal 178. A switch arm 180 is secured to the terminal 177 and has an end contact portion 181 which is aligned with and operable to abut the contact 179. The switch arm 180 is constructed of a resilient material and has a central longitudinal tongue portion 182 extending therefrom. The tongue portion 182 is biased against an abutment member 183 so that the switch arm contact 181 will be biased toward a closed position and abut the contact 179. The plunger or switch actuator 90 extends through the switch casing and has a head portion 184 operable to exert a force on the switch arm 180. Upon inward movement of the plunger 90, the head portion 184 must oppose the biasing force exerted by the switch arm tongue portion 182 in order to open the switch contacts 179 and 181. While the switch is in an open position, an outward force will be exerted on the plunger 90 by the switch arm tongue portion 182 tending to close the contacts 179 and 181. Thus, it will be seen that it is necessary for the force exerted by the stem 59 to exceed the force of the switch arm 180 in order to open the switch contacts 179 and 181. The heretofore described switch is only one of the many modified types of switches that could be used in this control device and it is to be understood that this invention is not to be limited to the specific switch described.

*Operation*

The control device is initially calibrated in the following manner:

The first shaft 140 is rotated about the second shaft 148 until the washers 161 and 162 abut the first lever offset edge portions 100 and 101. The set screws 146 and 147 are tightened on the shaft supporting member 126 to secure the first shaft 140 thereto. The actuating pointer indicating portion 139 is positioned to indicate a temperature on the dial member 132 corresponding to the temperature of a liquid bath. The power element 39 is immersed in the liquid bath and the nut 116 is then rotated about the second shaft 148 until the switch 83 is actuated. This calibration is normally accomplished at the factory.

The control device is positioned in a hot water system, or the like, by first threadedly securing the tubular connecting member 65 in an aperture provided therein and inserting the power element housing 40 in the tubular connecting member aperture 67 until the connecting member shoulder portion 68 abuts the housing member raised portion 42. The screw member 72 is tightened in the tubular connecting member aperture 71 to secure the power element housing rigidly thereto. Upon elevation in temperature of the water within the heating system the thermostatically expansive fluid within the chamber 49 will expand and compress the bellows 48 against the force of the spring 64. Since a greater force is required to compress the override spring 58 than to compress the spring 64, the guide member 55 will move longitudinally in the retainer member aperture 46 and the stem or rod 59 will move in the frame body portion aperture 17. Upon a given rise in temperature, the stem conical end portion 61 will abut the actuating lever indented central portion 114 and exert a force thereon.

Since the main lever 92 is pivoted at its upper end on the pin 105 and the actuating lever 93 is pivoted on the lower end of the first lever 92, the inward movement of the stem 59 would tend to rotate the actuating lever 93 about its pivotal connection to the first lever 92. However, the actuating lever 93 abuts the switch plunger 90 at its offset end portion 115; and in order for the actuating lever 93 to rotate in a counterclockwise direction, as viewed in Fig. 1, it is necessary that the force of the stem 59 exceed the opposing force of the switch arm 180 and the first lever 92 must abut the washer 162. If the actuating pointer indicator portion 139 is positioned on the dial 132 at an indicated temperature higher than the temperature of the water within the heating system, the washer member 162 will be spaced from the first lever offset edge portion 101 and the movement of the stem 59 will be translated into movement of the first lever 92. Upon further increase in temperature, the force exerted by the stem end portion 61 on the actuating lever 93 will rotate the first or main lever 92 about its pivotal connection to the pin 105 in a clockwise direction, as viewed in Fig. 1, until the offset edge portion 101 abuts the washer 162. Further rotative movement of the first lever is prevented by the first shaft 140, and further movement of the stem 59 will rotate the actuating lever about its pivotal connection to the first or main lever 92 in a counter-clockwise direction until the plunger 90 moves against the bias of the switch arm 180 and opens the switch contacts 179 and 181, thus de-energizing the heating system. If it is desired to change the temperature at which the switch 83 will be opened, the first shaft 140 is rotated on the second shaft 148 to space the washer 162 from the first lever edge portion 101 a predetermined distance. The stem 59 is required to move a proportional distance in order to rotate the first lever 92 until the edge portion 101 abuts the washer 162 and opposes further rotation of the first lever 92. Then the actuating lever 93 is free to rotate about its pivotal connection to the first lever 92 and actuate the switch 83.

Should the temperature in the heating system continue to rise above the predetermined temperature, the bellows 48 will continue to collapse and the stem head portion 60 will move longitudinally in the guide member aperture 56 and compress the override spring 58, thus preventing damage to the control device.

The control device also has a differential means contained therein where the switch 83 will be actuated at a given temperature and will remain in its actuated position until there has been a predetermined decrease in temperature. Upon the predetermined decrease in temperature, the switch 83 will again move to its normally closed position. It should be understood at this point that this control device is operable to be actuated at a predetermined temperature without the inclusion of the differential means. In operation, if the control device is to be adjusted for a wide differential, the actuating pointer indicator portion 139 is spaced from the differential indicator pointer portion 157 which in turn will space the washer members 161 and 162 from the first lever edge portions 100 and 101. Upon a given rise in temperature, the bellows member 48 will collapse and in turn move the stem 59 toward the actuating lever 93. The stem conical end portion 61 will abut the indented central portion 114 and rotate the first or main lever 92 in a clockwise direction until the first lever edge portion 101 abuts the washer member 162. Further movement of the stem 59 will rotate the actuating lever 93 in a counter-clockwise direction about its pivotal connection to the first lever 92, and the actuating lever bearing portion 115 will depress the switch plunger 90 against the bias of the switch arm 180 and actuate the switch 83. It should be noted that while the first lever 92 is being rotated in a clockwise direction the differential spring 176 is being compressed and biases the lever 92 against the rotative force of the stem 59. The biasing force of the spring 176 is not as large as the force of the switch arm 180 due to the position of the spring 176 relative to the pivotal connection of the first lever 92 to the frame flange 13. On a reduction of temperature, the bellows 48 will expand due to the force of the spring 64 and the stem 59 will retract in a direction away from the actuating lever 93. The first lever 92 will rotate in a counter-clockwise direction and the edge portion 101 will move away from the washer 162. However, the differential spring 176 exerting a force on the lever 92 will maintain the actuating lever in operative relation with the stem front end portion 61 and hold the switch plunger 90 in its actuated position. Upon further decrease in temperature, the stem 59 will continue to retract, and the first lever 92 will rotate in a counter-clockwise direction until the first lever edge portion 100 abuts the washer member 161. Thus, it will be seen that the biasing force of the differential spring 176 is opposed by the washer 161 and prevents further counter-clockwise rotation of the first lever 92. Further retraction of the stem 59 will permit the switch arm 180 to exert a force upon the actuating lever bearing portion 115 which is now not opposed by the stem 59 due to the reduction in temperature and the switch arm will move to its closed position. Therefore, to adjust the differential wherein the switch 83 will remain in an open position during a predetermined range of temperature, all that is necessary is to space the actuating pointer indicator portion 157 from the differential pointer indicator portion 139 which in turn will space the washer members 161 and 162 from the first lever edge portions 100 and 101 a similar distance. This is due to the fact that the first shaft 140 is threadedly secured to the second shaft 148 and rotation of the first shaft 140 on the second shaft 148 will move the first shaft 140 longitudinally on the second shaft 148 and will in turn space the washer members 161 and 162 from each other since the washer 161 abuts a stationary member 160 on the second shaft 148 and the washer 162 abuts the end portion of the first shaft 140.

A friction plug 159 is inserted in the shaft supporting member aperture 131 to exert a frictional force on the second shaft 148 and prevent its free rotation in the first shaft 140.

It should also be noted that the washer members 161 and 162 are freely rotatable on the second shaft threaded portion 149 so that upon rotation of the second shaft 148 the first lever edge portions 100 and 101 will not dig into the washers 161 and 162 and not injure the first shaft end portion abutting the washer 162 or the retaining member 160 secured on the second shaft 148.

Although there has been shown only one embodiment of this invention, it will be obvious to those skilled in the art that modifications thereof might be made without departing from the scope and intent of this invention which should be limited only by the scope of the claims appended hereto.

Having thus described the invention, what is claimed and is desired to be secured by Letters Patent of the United States is:

1. In a control device, a lever supporting member, a first lever pivotally secured to said supporting member, an actuating lever pivotally secured to said first lever, a control device having a plunger directly engaged by said actuating lever, condition responsive means having a thrust rod directly engaging and operable to move said actuating lever, and stop means engageable with said first lever, said stop means being operable to oppose said condition responsive means whereby movement of said condition responsive means is translated into movement of said actuating lever to actuate said control device.

2. In a control device, a lever supporting member, a first lever pivotally secured to said supporting member, an actuating lever pivotally secured to said first lever, a control device having a plunger directly engaged by said actuating lever, a power element having a thrust rod directly engaging and operable to move said actuating lever, stop means engageable with said first lever and operable to oppose movement by said power element whereby movement of said power element in a direction toward said actuating lever is translated into movement of said actuating lever to actuate said control device, and adjustment means operable to position said stop means relative to said first lever so that the relative movement of said power element necessary to actuate said control device may be changed.

3. In a control device having a casing, a first lever positioned in and pivotally secured to said casing, an actuating lever pivotally secured to said first lever, a control device having a plunger for actuation by said actuating lever, a spring member biasing said plunger to a first position, said actuating lever having direct operative engagement with said plunger, a movable power element having a thrust member in direct operative engagement with said actuating lever between said pivot connection and said plunger engaging portion and rotate said first lever about its pivotal connection, and stop means engageable with said first lever and operable to oppose said power element movement whereby said actuating lever will rotate about its pivotal connection and move said plunger against the bias of said spring to a second position.

4. In a control device having a casing, a first lever positioned in and pivotally secured to said casing, an actuating lever pivotally secured to said first lever, a control device having a plunger for actuation by said actuating lever, a spring member biasing said plunger to a first position, said actuating lever having direct operative engagement with said plunger, a movable power element having a thrust member in direct operative engagement with said actuating lever between said first pivot connection and said plunger engaging portion and rotate said first lever about its pivotal connection, stop means engageable with said first lever and operable to oppose said power element movement whereby said actuating lever will rotate about its pivotal connection and move said plunger against the bias of said spring to a second position, and adjustment means operable to position said stop means relative to said first lever so that the relative movement of said power element necessary to move said plunger to its second position may be changed.

5. In a control device, a casing having a wall with a threaded aperture therethrough, a first lever positioned in and pivotally secured to said casing, an actuating lever pivotally secured to said first lever, a switch secured in said casing and having a plunger for actuation by said actuating lever, a spring member biasing said plunger to a first position, a portion of said actuating lever having direct operative engagement with said plunger, a temperature responsive power element secured to said casing, a rod member positioned within said casing and having one end secured to said power element and movable therewith, said rod member other end being operable to engage directly against said actuating lever between said pivot connection and said plunger engaging portion upon a predetermined elevation in temperature and rotate said first lever about its pivotal connection, and a shaft member positioned in said casing substantially normal to said first lever and having a threaded end portion extending through said threaded aperture, said shaft member having an abutment portion engageable with said first lever and operable to oppose said rod member movement in a direction toward said actuating lever so that said actuating lever will rotate about its pivotal connection and move said plunger against the bias of said spring to a second position, said shaft member being operable upon rotation to position said abutment portion relative to said first lever so that the relative movement of said rod member necessary to move said plunger to its second position may be changed.

6. In a control device, a casing having a front wall and a rear wall, said front and rear walls having aligned apertures therethrough, said front wall having a second aperture in spaced relation to its other aperture, a first lever positioned in and pivotally secured at one end to said casing, said first lever having an aperture therethrough substantially aligned with said casing aligned apertures, said first lever having a second aperture positioned in spaced relation to said last named aperture and substantially aligned with said casing front wall second aperture, an actuating lever having one end pivotally secured to said first lever free end, a switch member secured in said casing and having a plunger for actuation by said actuating lever, a spring member biasing said plunger to a first position, a portion of said actuating lever being in operative engagement with said plunger, a thrust rod extending through said casing front wall second aperture and said first lever second aperture, said thrust rod being secured at one end to a temperature responsive power element and reciprocally movable in said apertures in response to said power element, said thrust rod other end being operable to engage said actuating lever between said pivot connection and said plunger engaging portion and rotate said first lever about its pivotal connection, a nut positioned in said casing front wall first named aperture, said nut having a body portion and a head portion, said head portion abutting the outer surface of said casing front wall, said body portion having a circumferential recess portion normal to the longitudinal axis of said body portion and aligned with the inner surface of said casing front wall, a clip member having a body portion with a pair of prong portions extending therefrom, said prong portions being positioned in said nut body portion recesses and said clip body portion abutting the inner surface of said casing front wall thereby securing said nut in said aperture and exerting a friction on said nut to prevent free rotation thereof, a shaft having a head portion, a body portion, and a threaded end portion, said shaft being positioned in said rear wall aperture with said head portion extending beyond the outer surface of said casing rear wall, said shaft body portion extending through said first lever first-named aperture and said threaded end portion being threadedly secured in said nut, said shaft body portion having an abutment portion positioned between said first lever and said casing rear wall and engageable with said first lever to oppose the rotative movement of said first lever so that said thrust rod will rotate said actuating lever about its pivotal connection and move said plunger against the bias of said spring to a second position, said nut being rotatable in said casing front wall aperture to calibrate said control device and position said shaft abutment portion relative to said first lever so that upon a predetermined movement of said thrust rod in a direction toward said actuating lever said switch plunger will move to its second position, said shaft member being operable upon rotation in said nut to position said abutment portion relative to said first lever so that the relative movement of said thrust rod necessary to move said plunger to its second position may be changed.

7. In a control device, a lever supporting member, a first lever pivotally secured to said supporting member, an actuating lever pivotally secured to said first lever, a control device having a plunger for actuation by said actuating lever, a spring member biasing said plunger to a first position, said actuating lever being in operative engagement with said plunger, a movable power element operable to engage said actuating lever between said pivot connection and said plunger engaging portion and rotate said first lever about its pivotal connection, stop means engageable with said first lever and operable to oppose said power element movement whereby said actuating lever will rotate about its pivotal connection and move said plunger against the bias of said spring to a second position, and differential means comprising means, to bias said first lever away from said stop means, and second stop means engageable with said first lever and operable to oppose said biasing means whereby upon predetermined movement of said power element in a direction away from said actuating lever said biasing means will hold said plunger in its second position until said first lever abuts said second stop means, upon further movement of said power element in a direction away from said actuating lever the bias of said spring member will move said plunger to its first position.

8. In a control device having a casing, a first lever positioned in and pivotaly secured to said casing, an actuating lever pivotally secured to said first lever, a control device having a plunger for actuation by said actuating lever, a spring member biasing said plunger to a first position, said actuating lever being in operative engagement with said plunger, a movable power element operable to engage said actuating lever between said pivot connection and said plunger engaging portion and rotate said first lever about its pivotal connection, stop means engageable with said first lever and operable to oppose said power element movement whereby said actuating lever will rotate about its pivotal connection and move said plunger against the bias of said spring to a second position, differential means comprising means to bias said first lever away from said stop means, and second stop means engageable with said first lever and operable to oppose said biasing means whereby upon predetermined movement of said power element in a direction away from said actuating lever said biasing means will hold said plunger in its second position until said first lever abuts said second stop means, upon further movement of said power element in a direction away from said actuating lever the bias of said spring member will move said plunger to its first position, and adjustment means operable to position said first stop means relative to said first lever so that the relative movement of said power element necessary to move said plunger to its second position may be changed.

9. In a control device having a casing, a first lever positioned in and pivotaly secured to said casing, an actuating lever pivotally secured to said first lever, a control device having a plunger for actuation by said actuating lever, a spring member biasing said plunger to a first position, said actuating lever being in operative engagement with said plunger, a movable power element operable to engage said actuating lever between said pivot connection and said plunger engaging portion and rotate said first lever about its pivotal connection, stop means engageable with said first lever and operable to oppose said power element movement whereby said actuating lever will rotate about its pivotal connection and move said plunger against the bias of said spring to a second position, differential means comprising means to bias said first lever away from said stop means, and second stop means engageable with said first lever and operable to oppose said biasing means whereby upon predetermined movement of said power element in a direction away from said actuating lever said biasing means will hold said plunger in its second position until said first lever abuts said second stop means, upon further movement of said power element in a direction away from said actuating lever the bias of said spring member will move said plunger to its first position, and differential adjustment means operable to position said second stop means relative to said first lever so that the movement of said power element in a direction away from said actuating lever necessary for said first lever to engage said second stop means may be changed.

10. In a control device having a casing, a first lever positioned in and pivotally secured to said casing, an actuating lever pivotally secured to said first lever, a control device having a plunger for actuation by said actuating lever, a spring member biasing said plunger to a first position, said actuating lever being in operative engagement with said plunger, a movable power element operable to engage said actuating lever between said pivot connection and said plunger engaging portion and rotate said first lever about its pivotal connection, stop means engageable with said first lever and operable to oppose said power element movement whereby said actuating lever will rotate about its pivotal connection and move said plunger against the bias of said spring to a second position, differential means comprising means to bias said first lever away from said stop means, and second stop means engageable with said first lever and operable to oppose said biasing means whereby upon predetermined movement of said power element in a direction away from said actuating lever said biasing means will hold said plunger in its second position until said first lever abuts said second stop means, upon further movement of said power element in a direction away from said actuating lever the bias of said spring member will move said plunger to its first position, adjustment means operable to position said first stop means relative to said first lever so that the relative movement of said power element necessary to move said plunger to its second position may be changed, and differential adjustment means operable to position said second stop means relative to said first lever so that the movement of said power element in a direction away from said actuating lever necessary for said first lever to engage said second stop means may be changed.

11. In a control device, a casing having a wall with a threaded aperture therethrough, a first lever positioned in and pivotally secured to said casing, an actuating lever pivotally secured to said first lever, a switch secured in said casing and having a plunger for actuation by said actuating lever, a spring member biasing said plunger to a first position, a portion of said actuating lever being in operative engagement with said plunger, a temperature responsive power element secured to said casing, a rod member positioned within said casing and having one end secured to said power element and movable therewith, said rod member other end being operable to engage said actuating lever between said pivot connection and said plunger engaging portion upon a predetermined elevation in temperature and rotate said first lever about its pivotal connection, a shaft member positioned in said casing substantially normal to said first lever and having a threaded end portion extending through said threaded aperture, said shaft member having an abutment portion engageable with said first lever and operable to oppose said rod member movement in a direction toward said actuating lever so that said actuating lever will rotate about its pivotal connection and move said plunger against the bias of said spring to a second position, said shaft member being operable upon rotation to position said abutment portion relative to said first lever so that the relative movement of said rod member necessary to move said plunger to its second position may be changed, and means to bias said first lever away from said abutment portion, said shaft having a second abutment portion engageable with said first lever and operable to oppose said biasing means whereby upon predetermined movement of said rod member in a direction away from said actuating lever said biasing means will hold said plunger in its second position until said first lever abuts said second abutment portion, upon further movement of said rod member in a direction away from said actuating lever the bias of said spring member will move said plunger to its first position.

12. In a control device, a casing having a wall with a threaded aperture therethrough, a first lever positioned in and pivotally secured to said casing, an actuating lever pivotally secured to said first lever, a switch secured in said casing and having a plunger for actuation by said actuating lever, a spring member biasing said plunger to a first position, a portion of said actuating lever being in operative engagement with said plunger, a temperature responsive power element secured to said casing, a rod member positioned within said casing and having one end secured to said power element and movable therewith, said rod member other end being operable to engage said actuating lever between said pivot connection and said plunger engaging portion upon a predetermined elevation in temperature and rotate said first lever about its pivotal connection, a shaft member positioned in said casing substantially normal to said first lever and having a threaded end portion extending through said threaded aperture, said shaft member having an abutment portion engageable with said first lever and operable to oppose said rod member movement in a direction toward said actuating lever so that said actuating lever will rotate about its pivotal connection and move said plunger against the bias of said spring to a second position, said shaft member being operable upon rotation to position said abutment portion relative to said first lever so that the relative movement of said rod member necessary to move said plunger to its second position may be changed, means to bias said first lever away from said abutment portion, said shaft having a second abutment portion engageable with said first lever and operable to oppose said biasing means whereby upon predetermined movement of said rod member in a direction away from said actuating lever said biasing means will hold said plunger in its second position until said first lever abuts said second abutment portion, upon further movement of said rod member in a direction away from said actuating lever the bias of said spring member will move said plunger to its first position, and adjustment means operable to position said shaft first abutment portion on said shaft relative to said first lever so that the relative movement of said rod member necessary to move said plunger to its second position may be changed.

13. In a control device, a casing having a wall with a threaded aperture therethrough, a first lever positioned in and pivotally secured to said casing, an actuating lever pivotally secured to said first lever, a switch secured in said casing and having a plunger for actuation by said actuating lever, a spring member biasing said plunger to a first position, a portion of said actuating lever being in operative engagement with said plunger, a temperature responsive power element secured to said casing, a rod member positioned within said casing and having one end secured to said power element and movable therewith, said rod member other end being operable to engage said actuating lever between said pivot connection and said plunger engaging portion upon a predetermined elevation in temperature and rotate said first lever about its pivotal connection, a shaft member positioned in said casing substantially normal to said first lever and having a threaded end portion extending through said threaded aperture, said shaft member having an abutment portion engageable with said first lever and operable to oppose said rod member movement in a direction toward said actuating lever so that said actuating lever will rotate about its pivotal connection and move said plunger against the bias of said spring to a second position, said shaft member being operable upon rotation to position said abutment portion relative to said first lever so that the relative movement of said rod member necessary to move said plunger to its second position may be changed, means to bias said first lever away from said abutment portion, said shaft having a second abutment portion engageable with said first lever and operable to oppose said biasing means whereby upon predetermined movement of said rod member in a direction away from said actuating lever said biasing means will hold said plunger in its second position until said first lever abuts said second abutment portion, upon further movement of said rod member in a direction away from said actuating lever the bias of said spring member will move said plunger to its first position, and differential adjustment means operable to position said shaft second abutment portion relative to said first lever so that the movement of said rod member in a direction away from said actuating lever necessary for said first lever to engage said shaft second abutment portion may be changed.

14. In a control device, a casing having a wall with a threaded aperture therethrough, a first lever positioned in and pivotally secured to said casing, an actuating lever pivotally secured to said first lever, a switch secured in said casing and having a plunger for actuation by said actuating lever, a spring member biasing said plunger to a first position, a portion of said actuating lever being in operative engagement with said plunger, a temperature responsive power element secured to said casing, a rod member positioned within said casing and having one end secured to said power element and movable therewith, said rod member other end being operable to engage said actuating lever between said pivot connection and said plunger engaging portion upon a predetermined elevation in temperature and rotate said first lever about its pivotal connection, a shaft member positioned in said casing substantially normal to said first lever and having a threaded end portion extending through said threaded aperture, said shaft member having an abutment portion engageable with said first lever and operable to oppose said rod member movement in a direction toward said actuating lever so that said actuating lever will rotate about its pivotal connection and move said plunger against the bias of said spring to a second position, said shaft member being operable upon rotation to position said abutment portion relative to said first lever so that the relative movement of said rod member necessary to move said plunger to its second position may be changed, means to bias said first lever away from said abutment portion, said shaft having a second abutment portion engageable with said first lever and operable to oppose said biasing means whereby upon predetermined movement of said rod member in a direction away from said actuating lever said biasing means will hold said plunger in its second position until said first lever abuts said second abutment portion, upon further movement of said rod member in a direction away from said actuating lever the bias of said spring member will move said plunger to its first position, adjustment means operable to position said shaft first abutment portion relative to said first lever so that the relative movement of said rod member necessary to move said plunger to its second position may be changed, and differential adjustment means operable to position said shaft second abutment portion relative to said first lever so that the movement of said rod member in a direction away from said actuating lever necessary for said first lever to engage said shaft second abutment portion may be changed.

15. In a control device, a casing having a wall with a threaded aperture therethrough, a first lever positioned in and pivotally secured to said casing, an actuating lever pivotally secured to said first lever, a switch secured in said casing and having a plunger for actuation by said actuating lever, a spring member biasing said plunger to a first position, a portion of said actuating lever being in operative engagement with said plunger, a temperature responsive power element secured to said casing, a rod member positioned within said casing and having one end secured to said power element and movable therewith, said rod member other end being operable to engage said actuating lever between said pivot connection and said plunger engaging portion upon a predetermined elevation in temperature and rotate said first lever about its pivotal connection, a shaft member positioned in said casing substantially normal to said first lever and having a central longitudinal threaded aperture therethrough, a second shaft member having a body portion and a threaded portion, said second shaft member being threadedly secured in said first shaft member aperture and being rotatably movable longitudinally on said second shaft, said second shaft having its end portion threadedly secured in said casing aperture and rotatable therein, means to rotate said first shaft member on said second shaft member, said first shaft member having an end portion engageable with said first lever and operable to oppose said rod member movement in a direction toward said actuating lever so that said actuating lever will rotate about its pivotal connection and move said plunger against the bias of said spring to a second position, means to bias said first lever away from said first shaft member end portion, and an abutment member having a central aperture therethrough, said abutment member positioned on said second shaft member between said casing wall and said first lever member, means to prevent longitudinal movement of said abutment member on said second shaft member, said abutment member being engageable with said first lever and operable to oppose said biasing means whereby upon predetermined movement of said rod member in a direction away from said actuating lever said biasing means will hold said plunger in its second position until said first lever abuts said abutment member, upon further movement of said rod member in a direction away from said actutaing lever the bias of said spring member will move said plunger to its first position, said first shaft member end portion being movable relative to said first lever by means of rotation of said first shaft member on said second shaft member so that the relative movement of said rod necessary to move said plunger to its second position may be changed, said abutment member being adjustable relative to said first lever by means of rotation of said second shaft member in said casing aperture so that the relative movement of said rod member in a direction away from said actuating lever necessary for said lever to engage said abutment member may be changed.

16. In a control device, a casing having a wall with an aperture therethrough, a nut positioned in said casing wall aperture, said nut having a body portion and a head portion, said head portion abutting the outer surface of said casing wall, said body portion having a circumferential recess portion normal to the longitudinal axis of said body portion and substantially aligned with the inner surface of said casing wall, a clip member having a body portion with a pair of prongs extending therefrom, said prongs being positioned in said nut body portion recess and said clip body portion abutting the inner surface of said casing wall thereby securing said nut in said aperture and exerting a friction on said nut to prevent free rotation thereof, a first lever positioned in and pivotally secured to said casing, an actuating lever pivotally secured to said first lever, a switch secured in said casing and having a plunger for actuation by said actuating lever, a spring member biasing said plunger to a first position, a portion of said actuating lever being in operative engagement with said plunger, a temperature responsive power element secured to said casing, a rod member positioned within said casing and having one end secured to said power element and movable therewith, said rod member other end being operable to engage said actuating lever between said pivot connection and said plunger engaging portion upon a predetermined elevation in temperature and rotate said first lever about its pivotal connection, a first shaft member positioned in said casing substantially normal to said first lever and having a central longitudinal threaded aperture therethrough, a second shaft member having a body portion and a threaded portion, said second shaft member being threadedly secured in said first shaft member aperture and being rotatably movable along the longitudinal axis of said second shaft member, said second shaft member having its end portion threadedly secured in said nut and rotatable therein, means to rotate said first shaft member on said second shaft member, said first shaft member having an end portion engageable with said first lever and operable to oppose said rod member movement in a direction toward said actuating lever so that said actuating lever will rotate about its pivotal connection and move said plunger against the bias of said spring to a second position, means to bias said first lever away from said first shaft member end portion, and an abutment member having a central aperture therethrough, said abutment member positioned on said second shaft member between said casing wall and said first lever member, means to prevent longitudinal movement of said abutment member on said second shaft member, said abutment member being engageable with said first lever and operable to oppose said biasing means whereby upon predetermined movement of said rod member in a direction away from said actuating lever said biasing means will hold said plunger in its second position until said first lever abuts said abutment member, said rod member upon further movement in a direction away from said actuating lever will permit said spring member to move said plunger to its first position, said first shaft member end portion being movable relative to said first lever by means of rotation of said first shaft member on said second shaft member so that the relative movement of said rod necessary to move said plunger to its second position may be changed, said abutment member being adjustable relative to said first lever by means of rotation of said second shaft member in said nut so that the relative movement of said rod member in a direction away from said actuating lever necessary for said lever to engage said abutment member may be changed, said nut being rotatable in said casing aperture to calibrate said control device and position said first shaft member end portion relative to said first lever so that upon predetermined movement of said rod member in a direction toward said actuating lever said switch plunger will move to its second position.

17. In a control device, a casing having opposite walls with aligned apertures therethrough, a nut secured in one of said apertures, an adjustment rod supported in the other of said apertures and adjustably screw-threaded in said nut, an abutment member on said rod, a switch in said casing having an operating plunger, a supporting lever pivoted in said casing and having an opening therethrough receiving said rod, said lever engaging said abutment member to limit movement of said lever toward said plunger, an actuating lever pivotally mounted on said supporting lever, said supporting lever having an aperture, and an operating member extending through said lever aperture and engaging said actuating lever, said operating member being operable on said actuating lever to move said supporting lever against said abutment member and upon continued movement to move said actuating lever to operate said switch.

References Cited in the file of this patent

UNITED STATES PATENTS

| | | |
|---|---|---|
| 2,389,436 | Kearney | Nov. 20, 1945 |
| 2,671,838 | Senn | Mar. 9, 1954 |